Jan. 10, 1950 — L. ROSTOKER — 2,494,358
VIBRATION DAMPER FOR OVERHEAD CABLES
Filed Jan. 22, 1949 — 2 Sheets-Sheet 1
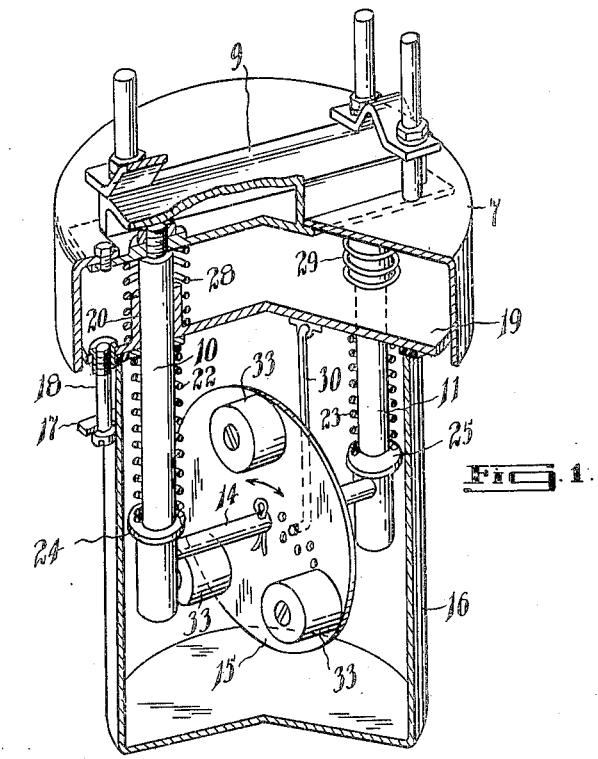
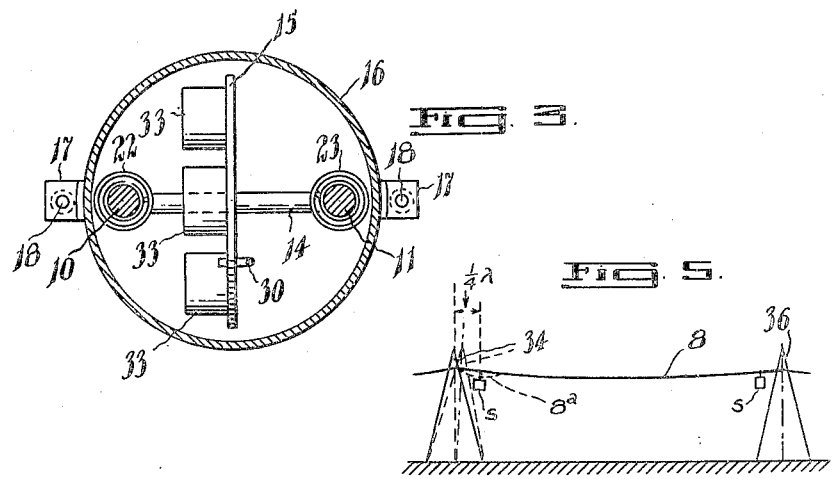
Inventor
Louis Rostoker
ATTY.

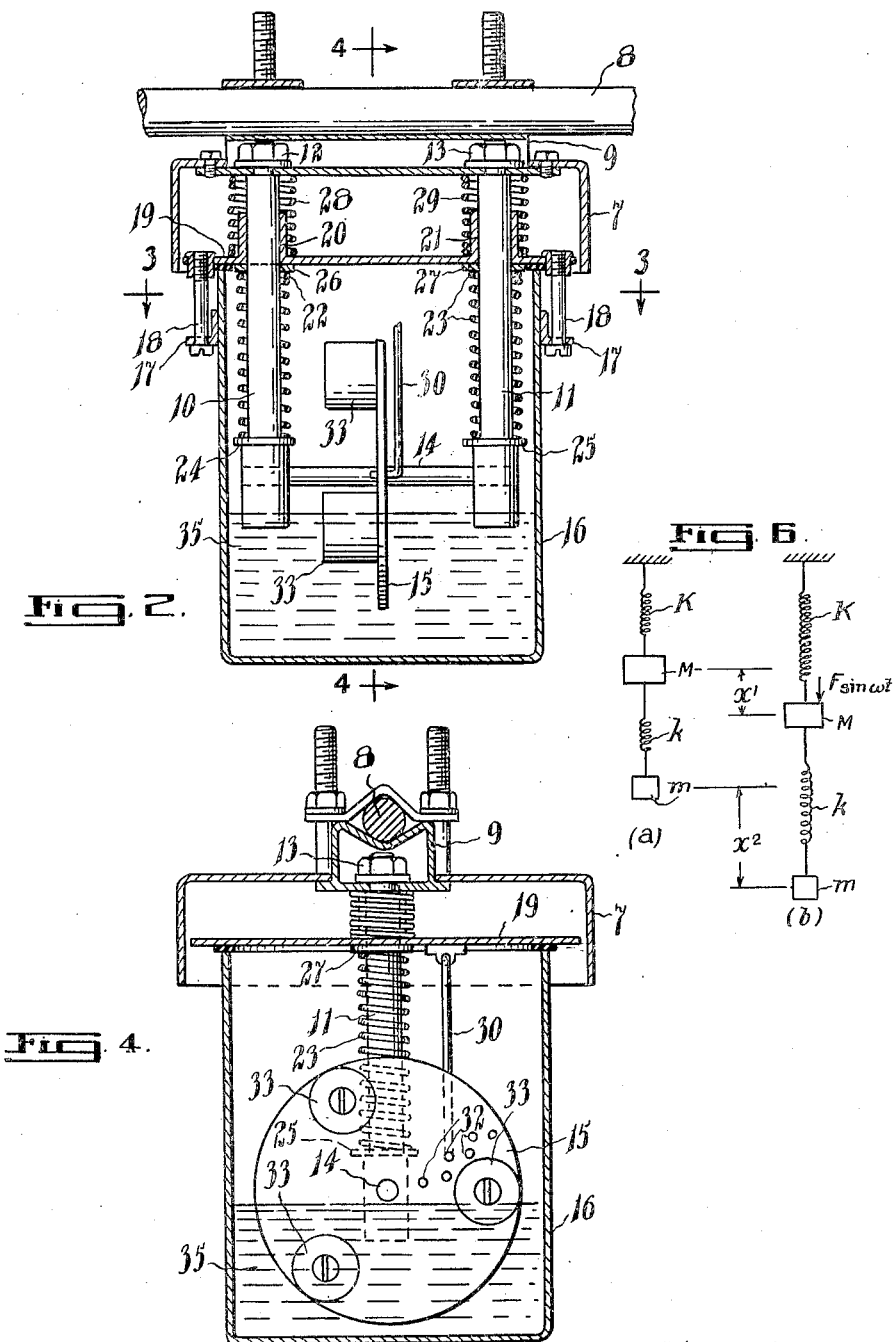

Patented Jan. 10, 1950

2,494,358

UNITED STATES PATENT OFFICE 2,494,358

VIBRATION DAMPER FOR OVERHEAD CABLES

Louis Rostoker, Toronto, Ontario, Canada

Application January 22, 1949, Serial No. 72,247

10 Claims. (Cl. 174—42)

This invention relates to vibration damping of overhead cables by means of a suppressor appropriately attached to the electrical transmission line, and more particularly to a suppressor adapted to introduce into the transmission line a counteracting vibration which will lessen tendencies toward creation of mechanical standing waves on the transmission line.

An object of this invention is to suppress transverse vertical vibration in transmission lines caused by the swaying of the supporting towers.

A further object of this invention is to provide a vibration suppressor which will absorb the energy of vibration from the transmission line to which it is attached and which will vibrate itself with a relatively large amplitude.

A still further object of this invention is to provide a vibration damper for transmission lines which may be adjusted to have a resonant frequency of vibration equal to that of a transmission line supporting tower.

A still further object of this invention is to provide a means whereby the effective mass of an oscillating body may be increased without materially increasing its weight.

A still further object of this invention is to provide a vibration damper having energy absorption means therein which will render mechanical adjustment of the damper in order to suit a variety of conditions, less critical.

All of the foregoing and still further objects and advantages of the invention will become apparent from a study of the following specification, taken in conjunction with the accompanying drawings, wherein like characters of reference indicate corresponding parts throughout the several views and wherein:

Fig. 1 is a side elevation in perspective of the device with a portion thereof cut away in order to show more clearly the internal construction;

Fig. 2 is a side elevation of the device taken on a vertical plane passing through the two supporting posts;

Fig. 3 is a section on the line 3—3 in Fig. 2;

Fig. 4 is a section on the line 4—4 in Fig. 2;

Fig. 5 illustrates the manner in which suppressors, constructed according to this invention, would be attached to a typical transmission line; and Fig. 6 is a schematic representation of the theoretical operation of the device.

Transverse vibration of a transmission line may be initiated by a gust of wind striking a supporting tower, thereby deflecting the tower with its supporting insulators in a direction parallel to that of the transmission line. This momentary deflection causes a slight slackening of the tension in the cable on the leeward side of the tower and adjacent the insulators extending therebetween. Ordinary wave motion will thereupon take place and this undulation in the transmission line will proceed at a certain velocity along the line in a direction away from the tower which initiated it. Just as sound waves may be reflected from a plane surface when they impinge thereon, so will this undulation be reflected back upon itself from the next succeeding tower, eventually reappearing somewhat attenuated at the transmission tower whence it originated. In the interim, the tower, due to its natural frequency of vibration, will have returned to its normal undeflected position and possibly will have initiated many more similar undulations. With normal transmission lines and towers, the distance between towers (i. e. the span), the tension in the cables, the height of the towers, and the design structure of the towers and supporting members, are such that the natural frequency of vibration of the tower in the direction of propagation of waves along the transmission line is many times greater than the fundamental frequency of vibration of the freely suspended span of wire extending between adjacent towers. As the direct consequence of this, the wavelength of the disturbance propagated by the vibrating tower is considerably shorter than the tower to tower span so that the resulting standing wave upon the line due to reflection from the next adjacent tower is actually close to a high order harmonic of the fundamental frequency of vibration of the transmission line. Hence, along the line, there will appear a large number of loops and nodes if the disturbance is allowed to build up into measurable proportions. Since vibration of this nature causes fatigue in the conducting cable, it is most desirable that it be minimized.

This invention discloses a construction of suppressor which is adapted to have a natural frequency of vibration equal to the natural frequency of vibration of the tower. The suppressor is suspended on the transmission line at a distance from the supporting insulator on the tower equal to ¼ of the wavelength of the potential standing wave on the line. The natural frequency of vibration of the suppressor is then adjusted to be as nearly as possible equal to that of the transmission line supporting tower, since the frequency of the standing wave on the transmission line will be equal to the resonant frequency of the supporting tower.

In order to explain the theoretical operation of the device hereinafter described in detail, it will be necessary to develop the equations of motion of a coupled system such as that shown in Fig. 6, wherein part (b) shows the system in part (a) in a deflected position, the extent of the deflections being indicated as $x_1$ and $x_2$. As shown in this figure, the extent of the deflection of M (which represents the suspended transmission line) is proportional to the periodic force $F \sin \omega t$. The spring constants of the suspension-coupling system are represented as K and $k$ and the masses of the system as M and $m$ respectively.

At any instant the forces acting on mass M are:

(1) $M\dfrac{d^2x_1}{dt^2}\uparrow$ the inertia force, (2) $Kx_1\uparrow$, the spring restoring force, (3) $k(x_1-x_2)\uparrow$, the restoring force of the coupler spring, and (4) $F \sin \omega t\downarrow$, the driving force.

Clearly, $(1)+(2)+(3)=(4)$ and therefore:

(5) $\quad M\dfrac{d^2x_1}{dt^2}+Kx_1+k(x_1-x_2)=F \sin \omega t$ (6) $\quad M\dfrac{d^2x_1}{dt^2}+x_1(k+K)-kx_2=F \sin \omega t$ Also, from Fig. 5 it will be seen that the forces acting on the coupled mass $m$ are:

(7) $m\dfrac{d^2x_2}{dt^2}\uparrow$ the inertial force, and (8) $k(x_2-x_1)\uparrow$ the restoring force of the coupling spring. Forces (7) and (8) are the only forces acting on mass $m$, and therefore we may write:

(9) $\quad m\dfrac{d^2x_2}{dt^2}+k(x_2-x_1)=0$

A certain amount of friction will always be present, and therefore the transient solution of the above Equations 6 and 9 need not be carried out, it being self-damped. It is only necessary that Equations 6 and 9 should be solved for the steady state oscillatory condition. Since steady state oscillation is sinusoidal, Equations 6 and 9 may be solved by substituting therein the equations:

(10) $\quad x_1=a_1 \sin \omega t$ and

(11) $\quad x_2=a_2 \sin \omega t$ where $a_1$ and $a_2$ are the crest values of the amplitudes of oscillation of masses M and $m$ respectively.

Substituting (10) and (11) in (6):

$M\dfrac{d^2(a_1 \sin \omega t)}{dt}+$
$\qquad a_1 \sin \omega t\,(k+K)-ka_2 \sin \omega t=F \sin \omega t$ $M\dfrac{d(a_1\omega \cos \omega t)}{dt}+$
$\qquad a_1 \sin \omega t(k+K)-ka_2 \sin \omega t=F \sin \omega t$ $-Ma_1\omega^2 \sin \omega t+$
$\qquad a_1 \sin \omega t(k+K)-ka_2 \sin \omega t=F \sin \omega t$ $a_1k+a_1K-a_2k-Ma_1\omega^2=F$

(12) $\quad a_1(k+K-M\omega^2)=F+a_2k$

Similarly, substituting in (9):

$m\cdot\dfrac{d^2(a_2 \sin \omega t)}{dt^2}+k(a_2 \sin \omega t - a_1 \sin \omega t)=0$ $m\cdot\dfrac{d(a_2\omega \cos \omega t)}{dt}+k(a_2 \sin \omega t-a_1 \sin \omega t)=0$ $-ma_2\omega^2 \sin \omega t+k(a_2 \sin \omega t-a_1 \sin \omega t)=0$

(13) $\quad a_2(k-m\omega^2)=a_1k$ or

(14) $\quad a_2=\dfrac{a_1k}{k-m\omega^2}$

Substitute Equation 14 in Equation 12 and solve for $a_1$:

$$a_1(k+K-M\omega^2)=F+\dfrac{a_1k^2}{k-m\omega^2}$$

$$a_1\left(k+K-M\omega^2-\dfrac{k^2}{k-m\omega^2}\right)=F$$

$$a_1=\dfrac{F}{k+K-M\omega^2-\dfrac{k^2}{k-m\omega^2}}$$

or:

$$a_1=\dfrac{F}{K\left(\dfrac{k}{K}+1-\dfrac{M}{K}\omega^2-\dfrac{k^2}{K(k-m\omega^2)}\right)}$$

Let $$p^2=\dfrac{k}{m}$$

and let $$P^2=\dfrac{K}{M}$$

Therefore $$a_1=\dfrac{F}{K}\cdot\dfrac{1}{\dfrac{k}{K}+1-\dfrac{\omega^2}{P^2}-\dfrac{k^2}{K\left(k-\dfrac{k\omega_2}{p^2}\right)}}$$

$$=\dfrac{F}{K}\cdot\dfrac{1}{1+\dfrac{k}{K}-\dfrac{\omega_2}{P^2}-\dfrac{k}{K}\cdot\dfrac{1}{1-\dfrac{\omega^2}{p_2}}}$$

or (15)

$$a_1=\dfrac{F}{K}\cdot\dfrac{1-\omega^2/p^2}{\left(1-\dfrac{\omega^2}{p^2}\right)\left(1+\dfrac{k}{K}-\dfrac{\omega^2}{P^2}\right)-\dfrac{k}{K}}$$

In a similar manner Equations 12 and 13 may be solved for $a_2$:

From Equation 12 we may write:

(16) $\quad a_1k\left(1+\dfrac{K}{k}-\dfrac{M\omega^2}{k}\right)=F+a_2k$

Substitute Equation 13 in Equation 16:

$$a_2(k-m\omega^2)\left(1+\dfrac{K}{k}-M\omega^2\right)=F+a_2k$$

$$a_2\left(k+K-M\omega^2-m\omega^2-m\omega^2\dfrac{K}{k}+m\omega^2\cdot\dfrac{M\omega^2}{k}\right)=F+a_2k$$

$$a_2\left[K-M\omega^2-m\omega^2\left(1+\dfrac{K}{k}-\dfrac{M\omega^2}{k}\right)\right]=F$$

$$a_2=\dfrac{F}{K}\cdot\dfrac{1}{1-\dfrac{M\omega^2}{K}-\dfrac{m\omega^2}{K}\left(1+\dfrac{K}{k}-\dfrac{M\omega^2}{k}\right)}$$

$$=\dfrac{F}{K}\cdot\dfrac{1}{1-\dfrac{M\omega^2}{K}-\dfrac{m\omega^2}{K}-\dfrac{m\omega^2}{k}+\dfrac{m\omega^2}{k}\cdot\dfrac{M\omega^2}{K}}$$

(17) Again, let $$p^2 = \frac{k}{m} \text{ and } P^2 = \frac{K}{M}$$

Then $$a^2 = \frac{F}{K} \cdot \frac{1}{1 - \frac{\omega^2}{P^2} - \frac{m\omega^2}{K} - \frac{\omega^2}{p^2} + \frac{\omega^2}{p^2} \cdot \frac{\omega^2}{P^2}}$$

Now:

$$m = \frac{k}{p^2}$$

(from Equation 17) and so:

$$a_2 = \frac{F}{K} \cdot \frac{1}{1 - \frac{\omega^2}{P^2} - \frac{k}{K} \cdot \frac{\omega^2}{p^2} - \frac{\omega^2}{p^2} + \frac{\omega^2}{p^2} \cdot \frac{\omega^2}{P^2}}$$

or (18)

$$a_2 = \frac{F}{K} \cdot \frac{1}{\left(1 - \frac{\omega^2}{p^2}\right)\left(1 + \frac{k}{K} - \frac{\omega^2}{P^2}\right) - \frac{k}{K}}$$

It may now be seen from the Equations 15 and 18 that of the factor $p$ of the coupled system comprising $k, m$ in which $$p^2 = \frac{k}{m}$$

is made equal to $\omega$, $a_1$ becomes 0 (see Equation 15), and $a_2$, the amplitude of oscillation of the coupled mass $m$, is found to be a maximum. It should also be noted that these amplitudes have the same values even if $P$ equals $\omega$, so long as $p = \omega$.

If the effect of resistance be neglected, the natural resonant frequency of any vibrating body expressed in radian measure is equal to the $$\sqrt{\frac{\text{spring constant}}{\text{mass}}}$$

Therefore, the symbols $p$ and $P$ represent the natural frequency of oscillation of the coupled mass systems $k, m$ and $K, M$ respectively. The result of this is that if the resonant frequency of the coupled system $k, m$, is chosen to be equal to the frequency of the applied force $F$ (said frequency being $\omega$ radians per second), Equations 15 and 18 are satisfied so that amplitude $a_1$ becomes 0 and amplitude $a_2$ becomes a maximum.

The mass M has been used in the foregoing theoretical development to represent the effective mass of a transmission line at the point at which the device hereinafter fully described is attached thereto. The force $F \sin \omega t$ is the periodic force which is impresed upon the transmission line. The frequency of this force ($\omega$) has been found to be determined by the resonant frequency of the supporting transmission line tower about its vertical axis. Standing waves developed upon the transmission line due to reflection of waves from towers next adjacent the tower which initiated the wave tend to build up upon the line, but due to the attachment of a spring-mass system $(k, m)$ at the effective force centre of the standing wave on the line, said standing wave can never build up to an appreciable magnitude, because the energy therein is transferred to the spring-mass system $k, m$ so that the latter takes on all the motion which would normally have existed on the transmission line. The function of the device hereinafter described is to provide a spring-mass system having operative characteristics substantially the same as the hypothetical system represented in the foregoing development as $k, m$ wherein the said device will operate throughout a wide variety of conditions of weather and also wherein the resonant frequency of the system may be easily adjusted so as to be as nearly as possible equal to the resonant frequency of the transmission line tower near which it is to be attached. The said resonant frequency of the system is varied by altering the effective mass of the system without substantially altering its actual weight.

Referring to Figs. 1, 2 and 4, a cap 7 is attached to transmission line cable 8 (Fig. 4) by a suitable clamping means designated generally as 9. A pair of supporting posts 10 and 11 are attached by means of nuts 12 and 13 respectively to cap 7, which, it will be noted, also functions as a corona shield. A shaft 14 extends between the lower extremities of posts 10 and 11, the said shaft carrying thereon a rotatably mounted inertia disc 15.

A cup-shaped member 16 is secured by means of angle brackets 17 and bolts 18 to a circular plate 19 having a diameter slightly less than the inside diameter of the cap 7. Passages 20 and 21 in plate 19 permit passage therethrough of posts 10 and 11. Helical springs 22 and 23 disposed on posts 10 and 11 respectively bear upon collars 24 and 25 (which provide stops for the springs) and press upwardly against bushings 26 and 27 disposed upon the underside of plate 19 so as to support the body of the device, said body being composed of cup 16 and plate 19. A second pair of helical springs 28 and 29 surround posts 10 and 11 respectively between plate 19 and the underside of cap 7. Springs 22 and 23 therefore tend to work against springs 28 and 29 so as to hold the body member in a more central position by pressing the plate 19 upon springs 28 and 29 as shown in Fig. 2. Since plate 19 is therefore effectively secured to the helical springs it cannot "bounce," and its oscillation will consequently be substantially sinusoidal.

Referring to Figs. 1 and 4, a link 30 connected by U-clamp 31 to plate 19 is also coupled at its opposite extremity eccentrically of inertia disc 15. It will be noted from Fig. 4, that a plurality of positions may be selected for the point at which member 30 may be secured to disc 15 relatively to the axis of rotation of the latter. A plurality of holes 32 each at a slightly different radius from the centre of rotation of disc 15 are provided therein for that purpose, and the overall purpose of this provision will be subsequently described.

Inertia disc 15 has three weights 33 attached to it near its outer periphery so that the moment of inertia of disc 15 about its axis of rotation is considerably increased. Since disc 15 is coupled to body plate 19 by link 30, any reciprocation of member 19 within cap 7 tends to cause rotation of disc 15 about its axis 14. Referring for a moment to Fig. 5, it will be seen that a deflection of the supporting tower 34 due to a gust of wind impinging thereon causes a momentary release of tension in transmission line 8 and therefore causes a momentary depression in the transmission line next adjacent tower 34 on the leeward side thereof. This undulation indicated in Fig. 5 as 8ᵃ proceeds away from the transmission line power whence it originated but will only have travelled a short distance before the transmission line supporting tower will have returned to its original undeflected position, once again restoring tension in the transmission line. Due to reflection of the wave $8^a$ from the next adjacent supporting tower 36, and of course due to continued oscillation of tower 34, a standing wave will develop upon the transmission line extending between towers 34 and 36, the wavelength of the said standing wave being clearly proportional to the resonant frequency of the supporting line tower 34 as previously described. Clearly therefore if the vibration suppressor indicated generally in Fig. 5 as S is attached at a one-quarter wavelength distance from the supporting tower the amplitude of deflection of cap 7 will tend to be a maximum. In other words, the suppressor will be attached at the effective force centre of the originating vibration. With reference now to Figs. 1, 2, 3 and 4, it will be seen that a momentary downward deflection of transmission line cable 8 (indicated as $8^a$ in Fig. 5), will cause a downward movement of supporting posts 10 and 11 and therefore a similar downward movement of inertia disc 15, all relatively to cup member 16 and cover plate 19 comprising the casing. It will be evident that springs 28 and 29 will be compressed and that springs 22 and 23 will be extended, and that also due to link 30 extending between plate 19 and a hole 32 in the inertia disc 15, the said disc will have rotated about its axis of rotation 14 as shown in Fig. 4.

It should be noted that for the sake of clarity, Fig. 4 is drawn as if cup 16 and plate 19 had moved upwardly to assume the raised position shown therein since this is in effect what really happens when once the system gets underway as an oscillating damper. (Also, this mode of depicting the suppressor in one of its many oscillatory positions lends a certain degree of clarity and simplification to the drawings.) Thus it will be seen that a rotary action is applied to disc 15 whenever there is relative motion between cap 7 and the casing. These two coupled bodies (the suppressor casing and transmission line at the point of suspension) comprise a resonant spring-mass system exactly analogous to the hypothetical system discussed above and represented in Fig. 6. The effective mass $m$ of the oscillating body is a function of the mass of members 16, 19, 30, 31 and the moment of inertia of disc 15 and weights 33 about axis 14 and is clearly greatly in excess of the mass represented by the sum of the masses of members 15, 16, 19, 30 and 31. This effective mass may be varied over a considerable range by adjustment of the radius at which link 30 is attached to disc 15. Springs 22, 23, 28 and 29 of course comprise the sole spring means and the combined spring-constant of the springs is exactly analogous of the spring constant $k$ used in the foregoing theoretical development. Therefore, with all these factors known, the suppressor may be designed to have any desired resonant frequency $$p=\sqrt{\frac{k}{m}}$$

where $m$ is, as outlined above, the effective mass of the oscillating suppressor casing.

It should be noted that fine adjustment of $m$ may be made by altering the amount of oil or other similar fluid 35 which is placed within cup member 16, said oil performing the function of "a mass variant," as well as a means of continual lubrication and as a damping means upon inertia disc 15 and weights 33. It is desirable that said damping means be provided since the result thereof is analogous to the result achieved when a resistance is placed either in series or in parallel with an electrical resonant circuit: a decrease in the selectivity of the critical frequency at which the coupled system oscillates at maximum amplitude. Thus, the provision of the fluid damping means, lessens the necessity for precision calculation of the frequencies of vibration of the transmission line tower and/or the suppressing means, since said suppressing means may then be made to operate over a much broader band of frequencies than would be achieved if damping therein were very small. To put the result in another manner, the provision of such an energy absorption factor as the kinematic viscosity of the oil or other fluid, renders the device less critical in operation and more likely to operate under variable conditions brought about by weather, ageing, and general mechanical variances in tower and suppressor constructions. It is therefore merely necessary that the theoretical frequency of oscillation of the transmission line damper be made as nearly as possible equal to the theoretical frequency of oscillation of the transmission line tower near which it is intended to attach it, in order that satisfactory operation of the device may be achieved.

To return for a moment to the original theoretical development, it will be seen that the resonant frequency of the suppressor may be taken to be that of the transmission line tower and therefore equal to the frequency of the periodic force F applied to the cap and various attachments thereto. The amplitude of vibration of the transmission line, $a_1$, therefore becomes 0, and $a_2$ the amplitude of vibration of the coupled mass $m$ becomes a maximum, and therefore body members 16 and 19 oscillate at a maximum amplitude.

It is thought that the construction and use of the invention will be apparent from the above description of the various parts and their purpose. It is to be understood that the form of the invention herewith shown and described is to be taken as a preferred example of the same and that various changes in the shape, size and arrangement of parts may be resorted to, without departing from the spirit of the invention or the scope of the subjoined claims.

What I claim as my invention is:

1. In a damping device including a mechanical spring-mass oscillatory system having a resonant frequency substantially determinable by the equation $$\omega=\sqrt{\frac{k}{m}}$$

where $k$ is the spring constant and $m$ is the effective mass of the system, a first member adapted to be secured to a body the vibrations of which are to be damped, a second member coupled by a spring to the first member and adapted to oscillate relatively to the first member, means for varying said mass so as to change the resonant frequency of the system the weight thereof remaining substantially constant, comprising an inertia disc rotatably disposed on one member of the oscillatory system, a link connected to the other member of the oscillatory system and connected eccentrically of the inertia disc, whereby linear oscillatory relative movement of the two said members imparts angular movement to the inertia disc so that the mechanical reaction thereof imparts to the linear oscillating member an effective mass the magnitude of which may be varied by adjusting the aforesaid link.

2. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member adapted to be secured to a body the vibrations of which are to be damped, a second member coupled by a spring to the first member and adapted to oscillate relatively to the first member, means for varying said mass so as to change the resonant frequency of the system the weight thereof remaining substantially constant, comprising an inertia disc rotatably disposed on one member of of the oscillatory system, a link connected to the other member of the oscillatory system and means for connecting the link to the disc at a plurality of radial positions eccentrically thereof, whereby linear oscillatory relative movement of the two said members imparts angular movement to the inertia disc so that the mechanical reaction thereof imparts to the linearly oscillating member an effective mass the magnitude of which may be varied by adjusting the aforesaid link.

3. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member adapted to be secured to a body the vibrations of which are to be damped, a second member coupled by a spring to the first member and adapted to oscillate relatively to the first member, means for varying said mass so as to change the resonant frequency of the system the weight thereof remaining substantially constant, comprising an inertia disc rotatably disposed on one member of the oscillatory system, a link connected to the other member of the oscillatory system and means for connecting the link to the disc at a plurality of radial positions eccentrically thereof, said means comprising a plurality of holes in the disc through any one of which the link may extend, whereby linear oscillatory relative movement of the two said members imparts angular movement to the inertia disc so that the mechanical reaction thereof imparts to the linearly oscillating member an effective mass the magnitude of which may be varied by adjusting the aforesaid link.

4. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member adapted to be secured to a body the vibrations of which are to be damped, a plurality of parallel posts secured to the first member, a second member spring mounted on the said posts, said second member being adapted to oscillate relatively to the first member, said oscillation compressing and extending said spring means, means for varying said mass so as to change the resonant frequency of the system the weight thereof remaining substantially constant, comprising an inertia disc rotatably disposed on the said first member, a link connected to the second member of the oscillatory system and connected eccentrically of the inertia disc, whereby linear oscillatory relative movement of the two said members imparts angular movement to the inertia disc so that the mechanical reaction thereof imparts to the linearly oscillating member an effective mass the magnitude of which may be varied by adjusting the aforesaid link.

5. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member adapted to be secured to a body the vibrations of which are to be damped, a pair of parallel posts secured to the first member, a second member provided with passages through which the posts extend, a stop on each post, spring means between the stops and the second member for supporting the second member so that the second member may oscillate longitudinally of the posts thereby compressing and extending the springs, means for varying said mass so as to change the resonant frequency of the system the weight thereof remaining substantially constant, comprising an inertia disc rotatably disposed on one member of the oscillatory system, a link connected to the other member of the oscillatory system and connected eccentrically of the inertia disc, whereby linear oscillatory relative movement of the two said members imparts angular movement to the inertia disc so that the mechanical reaction thereof imparts to the linearly oscillating member an effective mass the magnitude of which may be varied by adjusting the aforesaid link.

6. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member adapted to be secured to a body the vibrations of which are to be damped, a pair of parallel posts secured to the first member, a second member provided with passages through which the posts extend, a stop on each post below the second member, spring means between the stops and the second member for supporting the second member so that it may oscillate longitudinally of the posts thereby compressing and extending the springs, a second spring means between the second member and the first member to press the second member continuously upon the first helical springs in order to reduce non-sinusoidal oscillation of the second member, means for varying said mass so as to change the resonant frequency of the system the weight thereof remaining substantially constant, comprising an inertia disc rotatably disposed on one member of the oscillatory system, a link connected to the other member of the oscillatory system and connected eccentrically of the inertia disc, whereby linear oscillatory relative movement of the two said members imparts angular movement to the inertia disc so that the mechanical reaction thereof imparts to the linearly oscillating member an effective mass the magnitude of which may be varied by adjusting the aforesaid link.

7. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member adapted to be secured to a body the vibrations of which are to be damped, a pair of parallel posts secured to the first member, a second member provided with passages through which the posts extend, a stop on each post, a helical spring on each post resting on the stop and adapted to support the aforesaid second member so that the second member may oscillate longitudinally of the posts thereby compressing and extending the helical springs, means for varying said mass so as to change the resonant frequency of the system the weight thereof remaining substantially constant, comprising an inertia disc rotatably disposed on one member of the oscillatory system, a link connected to the other member of the oscillatory system and connected eccentrically of the inertia disc, whereby linear oscillatory relative movement of the two said members imparts angular movement to the inertia disc so that the mechanical reaction thereof imparts to the linearly oscillating member an effective mass the magnitude of which may be varied by adjusting the aforesaid link.

8. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member adapted to be secured to a body the vibrations of which are to be damped, a pair of parallel posts secured to the first member, a second member provided with passages through which the posts extend, a stop on each post below the second member, a helical spring on each post resting on the stop and adapted to support the aforesaid second member so that the second member may oscillate longitudinally of the posts thereby compressing and extending the helical springs, a second helical spring on each post between the second member and the first member to press the second member continuously upon the first helical springs in order to reduce non-sinusoidal oscillation of the second member, means for varying said mass so as to change the resonant frequency of the system the weight thereof remaining substantially constant, comprising an inertia disc rotatably disposed on one member of the oscillatory system, a link connected to the other member of the oscillatory system and connected eccentrically of the inertia disc, whereby linear oscillatory relative movement of the two said members imparts angular movement to the inertia disc so that the mechanical reaction thereof imparts to the linearly oscillating member an effective mass the magnitude of which may be varied by adjusting the aforesaid link.

9. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member including a cap adapted to be secured to a body the vibrations of which are to be damped, a pair of parallel posts secured to the first member, a second member including a cup-shaped member coupled by a spring to the first member and adapted to oscillate within the said cap of the first member, means for varying the said mass so as to change the resonant frequency of the system the weight thereof remaining substantially constant, comprising an inertia disc rotatably disposed between the pair of posts and within the cup-shaped member, a link connected at one end to the second member and at the other end eccentrically of the inertia disc, whereby linear oscillatory relative movement of the two said members imparts angular movement to the inertia disc so that the mechanical reaction thereof imparts to the linear oscillating member an effective mass the magnitude of which may be varied by adjusting the aforesaid link.

10. In a damping device including a mechanical spring-mass oscillatory system having a resonant frequency substantially determinable by the equation $$\omega = \sqrt{\frac{k}{m}}$$

where $k$ is the spring constant and $m$ is the effective mass of the system, a first member adapted to be secured to a body the vibrations of which are to be damped, a cup-shaped member carrying a quantity of fluid coupled by a spring to the first member and adapted to oscillate relatively to the first member, means for varying said mass so as to change the resonant frequency of the system the weight thereof remaining substantially constant, comprising an inertia disc rotatably disposed on one member of the oscillatory system and extending into the fluid, a link connected to the other member of the oscillatory system and connected eccentrically of the inertia disc so that the mechanical reaction thereof imparts to the linearly oscillating member an effective mass the magnitude of which may be varied by adjusting the aforesaid link, the natural resonant frequency of oscillation of the oscillatory system being rendered less critical by the viscosity of the fluid.

LOUIS ROSTOKER.

REFERENCES CITED

The following references are of record in the file of this patent:

UNITED STATES PATENTS

| Number | Name | Date |
|---|---|---|
| 989,958 | Frahm | Apr. 18, 1911 |
| 1,995,190 | Rostoker | Mar. 19, 1935 |